(12) United States Patent
Batur

(10) Patent No.: US 7,649,549 B2
(45) Date of Patent: Jan. 19, 2010

(54) MOTION STABILIZATION IN VIDEO FRAMES USING MOTION VECTORS AND RELIABILITY BLOCKS

(75) Inventor: Aziz Umit Batur, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 759 days.

(21) Appl. No.: 11/233,445

(22) Filed: Sep. 22, 2005

(65) Prior Publication Data

US 2006/0066728 A1 Mar. 30, 2006

Related U.S. Application Data

(60) Provisional application No. 60/613,265, filed on Sep. 27, 2004.

(51) Int. Cl.
*H04N 5/228* (2006.01)
(52) U.S. Cl. .................................................. 348/208.6
(58) Field of Classification Search ............. 348/208.1, 348/208.99, 208.4, 208.6
See application file for complete search history.

(56) References Cited

U.S. PATENT DOCUMENTS

| | | | | |
|---|---|---|---|---|
| 5,371,539 | A * | 12/1994 | Okino et al. | 348/208.6 |
| 5,563,652 | A * | 10/1996 | Toba et al. | 348/207.99 |
| 5,748,231 | A * | 5/1998 | Park et al. | 348/207.99 |
| 6,628,711 | B1 * | 9/2003 | Mathew et al. | 375/240.12 |
| 7,221,390 | B1 * | 5/2007 | Kutka | 348/208.4 |
| 2004/0201706 | A1 * | 10/2004 | Shimizu et al. | 348/208.4 |

* cited by examiner

*Primary Examiner*—Jason Chan
*Assistant Examiner*—Nicholas G Giles
(74) *Attorney, Agent, or Firm*—Mirna Abyad; Wade J. Brady, III; Frederick J. Telecky, Jr.

(57) ABSTRACT

Stabilization for devices such as hand-held camcorders segments a low-resolution frame into a region of reliable estimation, finds a global motion vector for the region at high resolution, and uses the global motion vector to compensate for jitter.

7 Claims, 4 Drawing Sheets

MOTION STABILIZATION IN VIDEO FRAMES USING MOTION VECTORS AND RELIABILITY BLOCKS

CROSS-REFERENCE TO RELATED APPLICATIONS

This application claims priority from provisional U.S. patent application No. 60/613,265, filed Sep. 27, 2004.

BACKGROUND OF THE INVENTION

The present invention relates to digital signal processing, and more particularly to video devices and processing methods.

Image stabilization (IS) refers to the task of eliminating jitter from video sequences captured by handheld cameras. Jitter is typically due to the undesired shake of the camera user's hand during video recording, and becomes a more severe problem when high zoom ratios are used. Eliminating jitter from video sequences has been an increasingly important problem for consumer digital cameras and camera phones. There are a few different approaches to the solution of the image stabilization problem. One particular approach is to use digital image processing techniques to eliminate jitter. This approach is generally called digital image stabilization (DIS).

A typical digital image stabilization method can be summarized as follows:

Step 1: Motion vector computation: Compute a number of candidate motion vectors between two frames by finding the correlations between blocks of pixels.

Step 2: Global motion vector determination: Process these candidate motion vectors using a number of heuristics to find the global motion between the two frames that is due to jitter.

Step 3: Motion compensation: Compensate for the estimated jitter motion by digitally shifting the output image in the reverse direction of the motion.

For example, U.S. Pat. No. 5,563,652 divides a image into four detection areas; within each detection area compares pixels of the current image with representative pixels of the prior image to find the best offset correlation; analyzes the best correlation to the average plus analyzes gradients to check whether the detection area is a valid detection area for jitter detection; and for invalid areas uses prior image(s) average motion vector(s) to compute a whole image motion vector. U.S. Pat. No. 5,748,231 matches binary edge patterns in motion estimation areas of successive fields to find local motion vectors; combines the local motion vectors with weights from correlation statistics to find field motion vectors; and accumulates the field motion vectors. U.S. Pat. No. 6,628,711 compares motion vector histograms for successive images to estimate jitter.

SUMMARY OF THE INVENTION

The present invention provides digital image stabilization from estimation of jitter by partition a low-resolution version of an input frame input blocks; determine reliability of each block's motion vector; segmentation according to motion vector reliability; computing a single motion vector for the blocks with reliable motion vectors; and scaling plus refining the single motion in the higher resolution versions of the input frame to give a jitter estimation.

DESCRIPTION OF THE PREFERRED EMBODIMENTS

A. Overview

Figure 5:
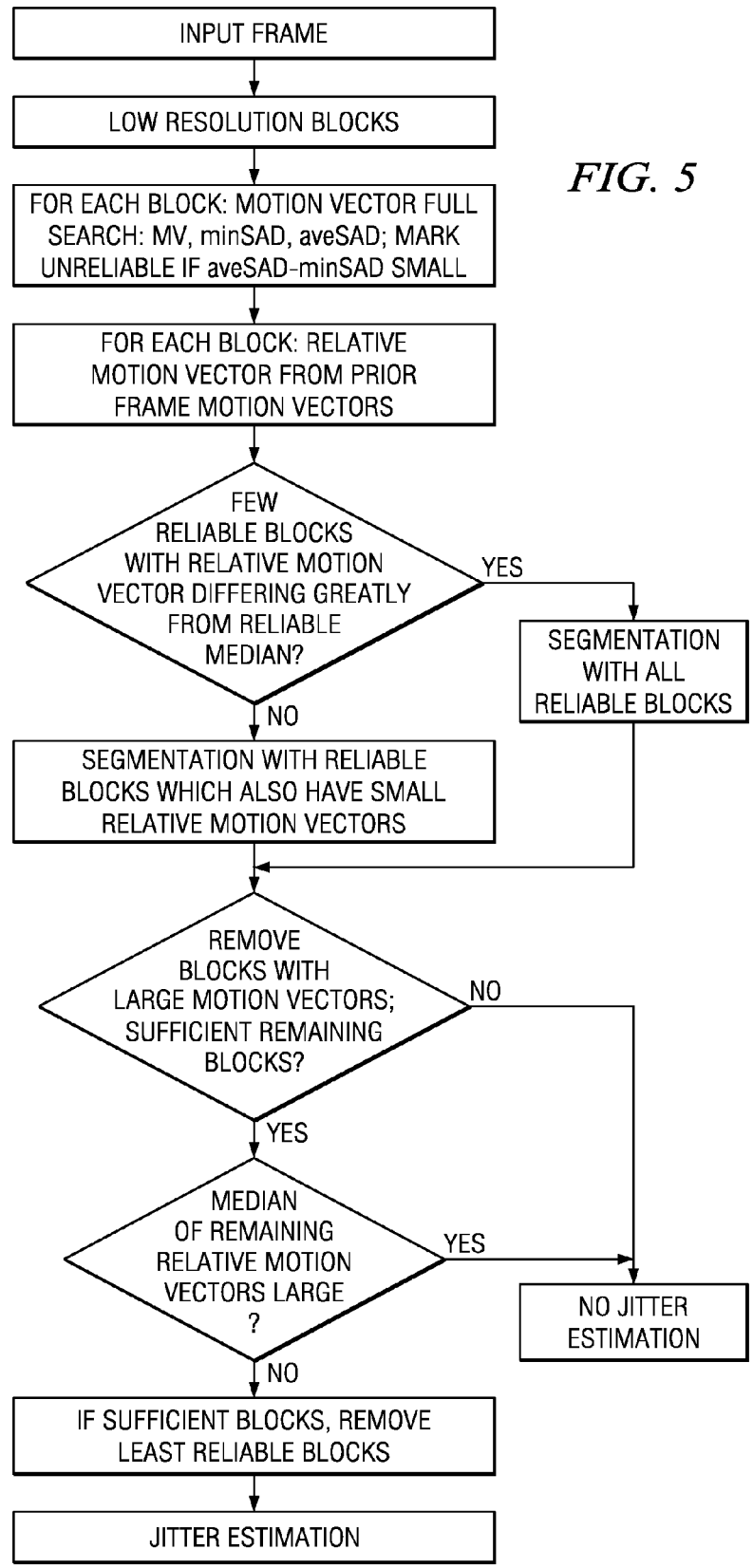
FIGS. 5-6 are flow diagrams for segmentation and stabilization.
Figure 6:
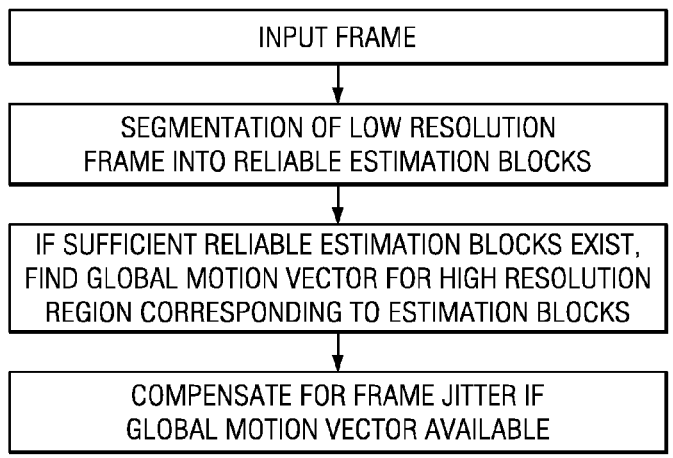

The first preferred embodiment method of motion stabilization, such as for hand-held video devices, estimates jitter motion and compensates accordingly. FIG. 5 is a flowchart for jitter estimation which includes the steps of: first, segment a low-resolution version of an input frame into valid and invalid blocks by analysis of block motion estimation, including accumulation of motion vectors for the co-located blocks in prior frames; next, aggregate all of the valid low-resolution blocks into a region and find a single motion vector for this region; and then extend to higher resolutions by scaling and refining the single motion vector to yield a global motion vector for the region at highest resolution. Stabilization applies the global motion vector, if available, to motion compensate the frame. FIG. 6 is a flowchart for the overall method.

Figure 7:
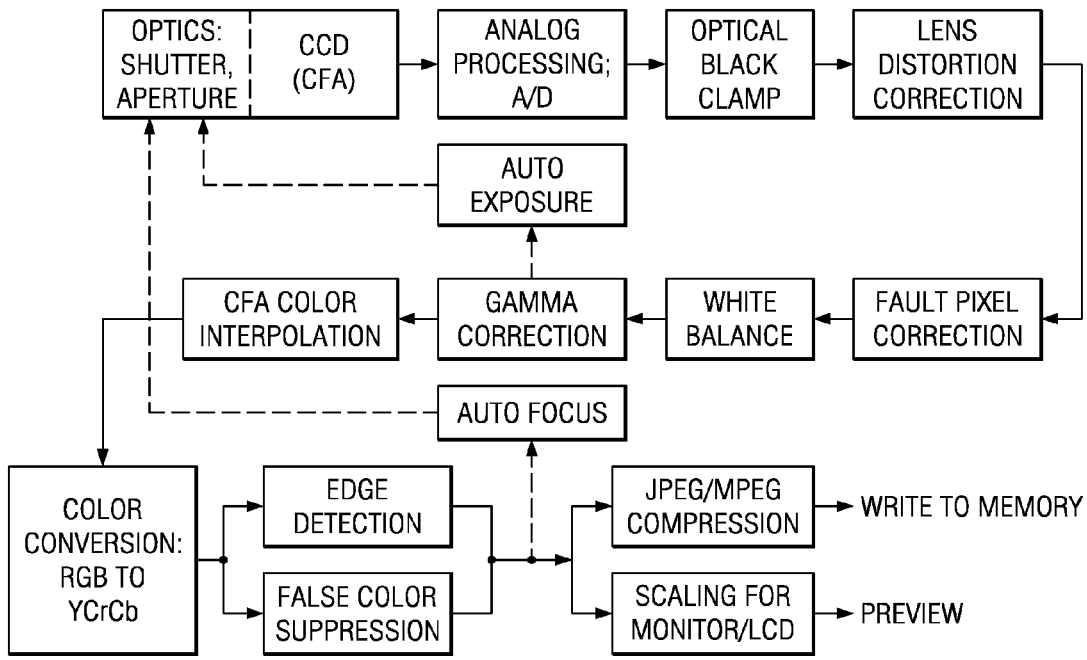
FIGS. 7-9 illustrate digital camera and network communication.

Preferred embodiment systems include camcorders, digital cameras, video cellphones, video display devices, et cetera, which perform preferred embodiment stabilization methods. FIG. 7 shows a generic image processing pipeline, and preferred embodiment stabilization could be performed in the MPEG/JPEG function and integrate with motion vector determination, although the preferred embodiment stabilization need not be encoded nor compressed. Indeed, unstabilized video could be displayed with preferred embodiment stabilization applied as part of the display process.

Figure 9:
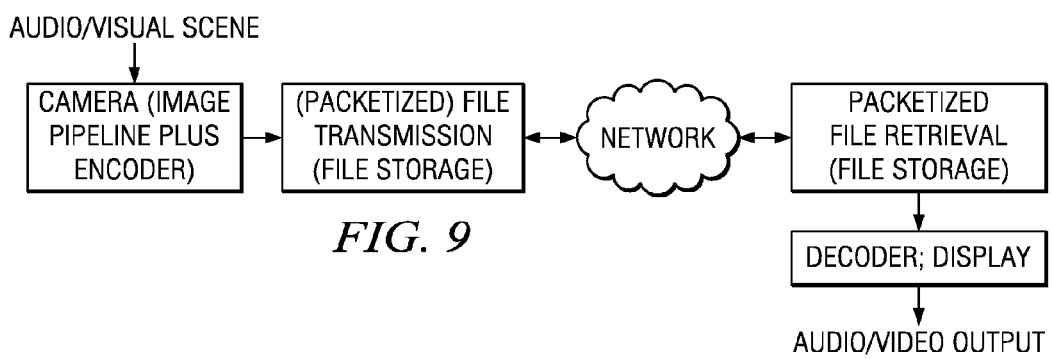
Figure 8:
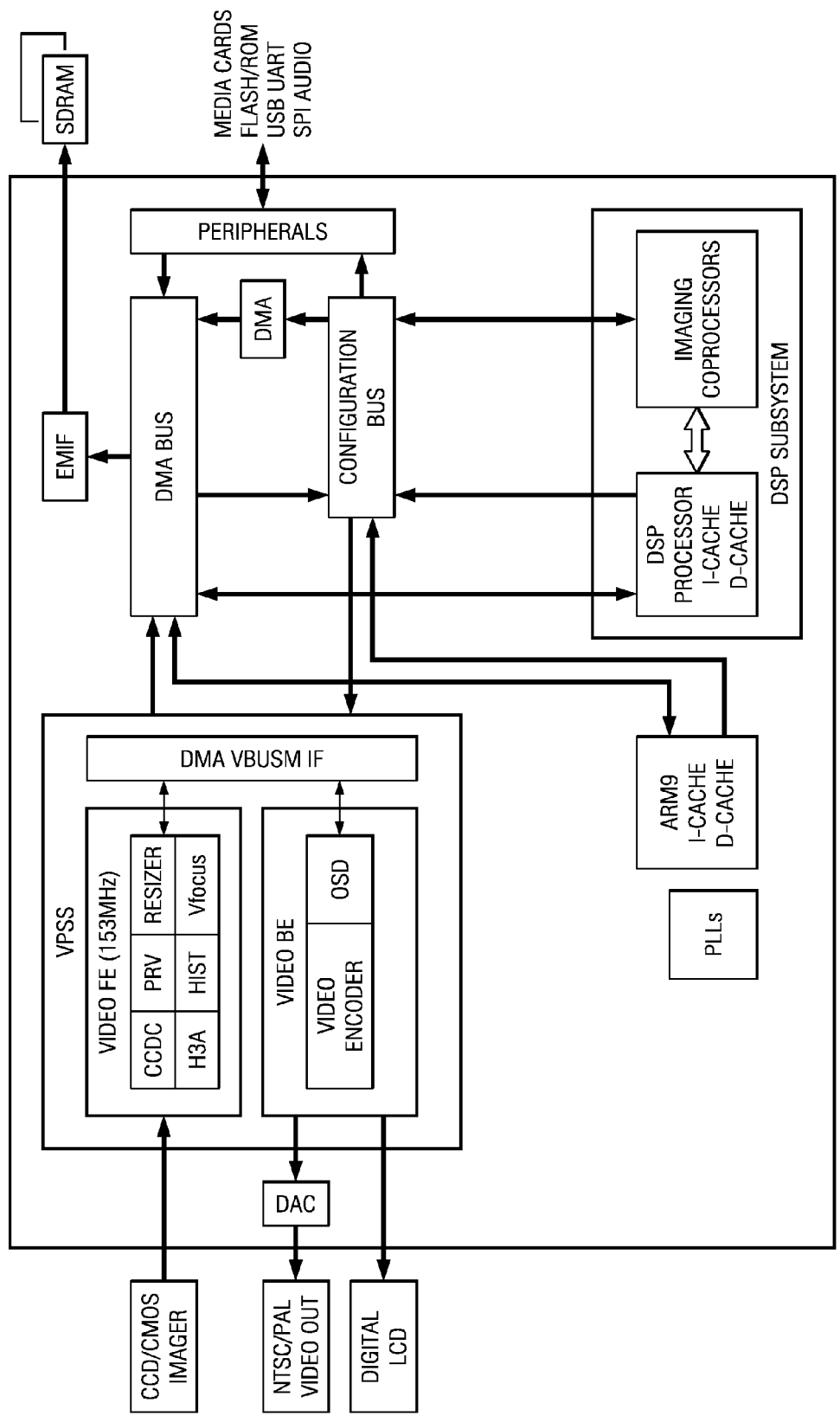

Preferred embodiment systems may be implemented with any of several types of hardware: digital signal processors (DSPs), general purpose programmable processors, application specific circuits, or systems on a chip (SoC) such as combinations of a DSP and a RISC processor together with various specialized programmable accelerators. FIG. 8 illustrates an example of a processor for digital camera applications with a video processing subsystem in the upper left. A stored program in an onboard or external (flash EEP) ROM or FRAM could implement the signal processing. Analog-to-digital converters and digital-to-analog converters can provide coupling to the real world, modulators and demodulators (plus antennas for air interfaces) can provide coupling for transmission waveforms, and packetizers can provide formats for transmission over networks such as the Internet; see FIG. 9.

B. First Preferred Embodiment

The design of a motion estimation method for DIS systems (steps 1 and 2 of the background) involves certain fundamental trade offs. An important trade off is related to the size of the blocks that are used to compute the motion vectors. The choice of the block size is influenced by two important factors: moving objects and noise. In general, large moving objects are a big challenge for DIS systems because a large moving object region in the image can produce a motion vector that shows the motion of the object instead of the jitter motion of the camera. Therefore, in general, it is advantageous to use smaller blocks for motion estimation so that motion vectors that are on large moving object regions can be identified in the motion vector determination stage (background step 2) and disregarded. However, using smaller blocks for motion estimation has a drawback because small blocks are less robust against lack of texture, noise, and small moving objects. As blocks get smaller, the accuracy of the computed motion vectors decreases. Therefore, it is advantageous to use as large blocks as possible. In the limiting case when there are no large moving objects in the scene, considering the whole frame as a single block would be the optimal approach. DIS systems in the past have addressed this trade off about blocks sizes by using intermediate solutions, most typically 3-4 blocks per frame. After the motion vectors for these blocks are computed, a number of heuristics can be employed to determine which of these candidate block motion vectors may be unreliable, especially due to large moving objects. Once the unreliable candidates are eliminated, a global motion vector is determined using only the reliable candidate motion vectors.

There are two problems in this prior art of digital image stabilization. First of all, the motion vector computation stage (background step 1) computes detailed motion vectors for all blocks, even if some of these blocks may be unreliable for motion estimation, most probably due to large moving objects. The motion vectors of these unreliable blocks are later thrown away during motion vector determination stage; therefore, all of the detailed motion estimation computation done for these blocks becomes essentially wasted. Computation of detailed motion vectors for such blocks could be avoided if we could identify through less costly means that their motion vectors would be unreliable. The second problem with the prior art is that since the unreliable blocks are not known beforehand, the reliable parts of the image cannot be combined into a very large block of pixels that could provide a very reliable motion vector. Computing motion vectors for smaller blocks separately and choosing a global motion vector among them is inferior to computing a global motion vector by combining all of these blocks into a single, large block.

The first preferred embodiment DIS approach overcomes these problems and includes the following three steps:

1. Segmentation: Computation of a block-based segmentation for each frame by processing the top level of a hierarchical image representation of the frame.

2. Global motion estimation: Estimation of a global motion vector for the frame using the hierarchical image representation and the previously computed segmentation.

3. Motion compensation: Compensation for the jitter motion in the current frame using the global motion vector.

The following provides detailed descriptions of these steps.

Step 1—Segmentation

Figure 1:
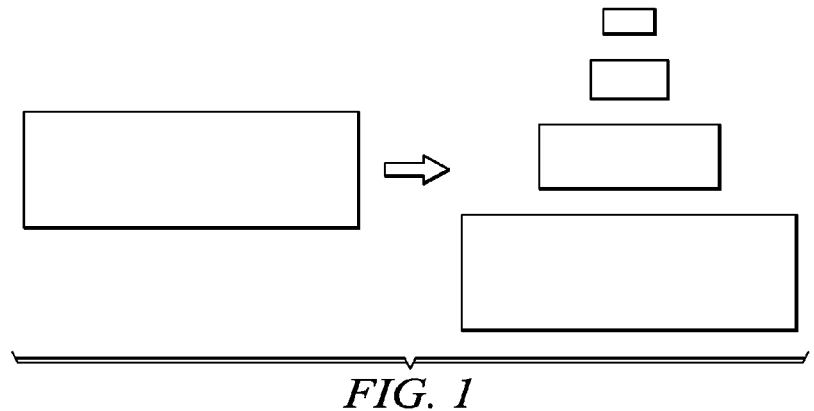
FIG. 1 illustrates a hierarchical image representation.

Each new captured video frame is first processed to produce a hierarchical image representation as shown in FIG. 1. This hierarchical representation consists of several versions of the original image at different resolutions. Each level of the representation is obtained by low-pass filtering a higher resolution level, such as with a Gaussian kernel, and then downsampling by 2 in each direction. This filtering and downsampling process is repeated multiple times to produce progressively lower resolution versions of the original frame. The number of levels of the hierarchical representation may change depending on the input frame size. For a VGA (640×480) input, for example, use a 4-level hierarchical representation, so the lowest resolution version is 80×60. The hierarchical representations of two frames (the current frame and the immediately previous frame) are kept in memory for motion estimation.

Figure 2:
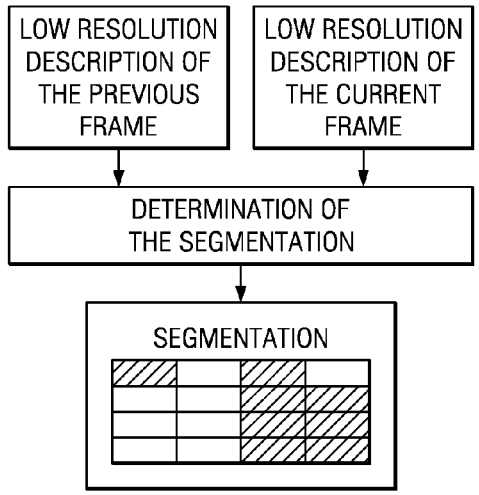
FIG. 2 shows image segmentation.

The top levels (lowest resolution) of the hierarchical representations of the current and previous frames are used to compute a block-based segmentation where each block is marked as either valid or invalid for motion estimation. The purpose of this segmentation is to identify which parts of the frame are reliable for estimating the camera motion. In the first preferred embodiment method, the segmentation is a 4×4 array of 16 blocks but leaves out the boundary region of the frame; see FIG. 2. Thus for the VGA 4-level hierarchy, each segmentation block could be 16×12 pixels, and the boundary region (used in motion estimation) would be 8 pixels wide along the vertical and 6 pixels wide along the horizontal.

To compute the segmentation for a frame, first perform motion estimation based on a sum of absolute differences (SAD) of luminance for each block at the top level (lowest resolution) of the hierarchical representation. This motion estimation is performed using a full-search, which involves computing a SAD for each possible integer-pixel motion vector (MV) and then picking the actual MV as the one with the smallest SAD. Note that for a possible MV, its SAD is the prediction error using the possible MV and the prior lowest resolution frame:

$$SAD(MV) = \Sigma_{(i,j) \in block} |p^t(i,j) - p^{t-1}(i+MV_x, j+MV_y)|$$

(If fractional MVs were to be used, then the predicted pixels are interpolations of reference block pixels.) Since this process is performed using two small, low-resolution frames, the computational complexity is low. During motion estimation, in addition to the MVs, also the minimum SAD and the average SAD for each block are also recorded. For example, with the 4-level VGA hierarchy and a typical search range of ±4 pixels vertically and ±6 pixels horizontally, there are 9*13 (=117) locations for a 16×12 block in the 80×60 lowest resolution frame, so there are 117 possible SADs to compute for each of the 16 blocks.

The MVs, average SADs, and minimum SADs that are computed during motion estimation are used to find the segmentation. The purpose of the segmentation is to identify which blocks would be unreliable for motion estimation. In general, blocks that have limited texture and blocks that are covered by large moving objects would be unreliable for motion estimation, and should be marked invalid in the segmentation. The next few paragraphs detail these two criteria.

Identifying blocks that have limited texture is relatively easy and can be done by inspecting the average SAD and minimum SAD of each block. The difference between the average SAD and minimum SAD is a measure of the texture content of a block. Blocks for which this SAD difference is smaller than a certain threshold are marked invalid in the segmentation. This threshold changes depending upon the block size and is computed from a collection of training video sequences. For the example 16×12 blocks with 8-bit luminance (pixel values in the 0-255 range) could use a threshold in the range of 100 to 300. The remaining valid blocks in the segmentation are further analyzed for the existence of moving objects. The most important feature for identifying moving objects is the relative motion between the scene and the camera. The relative motion is computed by accumulating MVs of a block over time. Consider the following equation that describes the motion vector of a block:

$$V_j^t = J^t + P^t + M_j^t$$

where $V_j^t$ is the MV for the $j^{th}$ block in the $t^{th}$ frame, $J^t$ is the jitter motion of the camera, $P^t$ is the panning motion of the camera, and $M_j^t$ is the motion of the object covering the $j^{th}$ block. Note that $J^t$ and $P^t$ are the same for all blocks, and $M_j^t$ can be different for each block depending on whether the block is covered by an object or by the background. It is assumed that $P^t$ and $M_j^t$ have low frequency content while $J^t$ has high frequency content. In other words, it is assumed that hand oscillations contain higher frequencies when compared to the panning motion of the camera and the object motions. The purpose of the video stabilization method is to estimate and compensate for $J^t$, which requires a way of determining which part of $V_j^t$ is due to $J^t$. By observing only the motion vectors in the current frame, $V_j^t$, it would not be possible to distinguish between jitter, panning, or moving object motions. However, if $V_j^t$ values are processed over a number of frames to obtain the relative motion between the scene and the camera for each block, useful conclusions can be drawn.

In particular, compute the relative motion between the object and the camera by accumulating MVs over time using a simple autoregression of the following form:

$$R_j^t = \alpha R_j^{t-1} + (1-\alpha) V_j^t$$

where $R_j^t$ is the relative motion for the $j^{th}$ block in the $t^{th}$ frame, $\alpha$ is the accumulation coefficient, and $V_j^t$ is the block motion vector. A first preferred embodiment uses an $\alpha$ in the range 0.6–0.8. This equation implements a low-pass filter for $V_j^t$. Since $J^t$ has high-frequency content, it will be mostly filtered out by this low-pass filter, which will result in the following approximate relation:

$$R_i^t = \Phi(J^t, J^{t-1}, \ldots) + \Phi(P^t, P^{t-1}, \ldots) + \Phi(M^t, M^{t-1}, \ldots)$$
$$\approx \Phi(P^t, P^{t-1}, \ldots) + \Phi(M^t, M^{t-1}, \ldots)$$

where $\Phi(., ., \ldots)$ represents the accumulation operation. Note that the relative motion includes contributions from the panning of the camera and the object motions. Ideally, jitter can be best estimated using regions that have no relative motion, such that $R_i^t \approx 0$. This would correspond to the case where there are no moving objects or panning. In general, however, a certain amount of panning can be tolerated in the motion compensation stage; therefore, use regions that have nonzero relative motion, but ensure that the nonzero relative motion is due to panning, not due to moving objects. Moving objects regions should not be included in the motion estimation procedure because objects move in unpredictable ways, which may cause artifacts in the stabilized sequence.

Considering all of these issues, the first preferred embodiment method finds the segmentation as follows:

(1) Initialize the segmentation by inspecting the SAD values computed for each block in the lowest resolution frame. If the difference between the average SAD and the minimum SAD of a block is smaller than a first threshold, mark that block as unreliable in the segmentation; otherwise, mark it as reliable. The first threshold depends upon block size and luminance value range; and the example 16×12 blocks with 8-bit luminance could use a threshold in the range of 100 to 300.

(2) For all the reliable blocks from (1), compute the median of all $R_i^t$ values. This is the median relative motion. Calculate the distance (sum of absolute values of x and y components) of each $R_i^t$ value to the median value, and count the number of blocks, N, whose $R_i^t$ has a distance to the median value which is larger than a second threshold. The second threshold depends upon the size of the lowest resolution frame because the motion vectors scale with the resolution. For the example lowest resolution frame size of 80×60, the second threshold may be in the range of 0.5–0.7.

(3) If N from (2) is smaller than a third threshold, conclude that there are no moving objects in the scene. In this case, each block contains jitter and possibly some panning, and the segmentation includes all of the blocks that are marked valid at this point. The third threshold depends upon the number of blocks used for the segmentation and may be in the range of 2 to 6 for the 16 blocks of the preferred embodiment.

(4) If N from (2) is larger than a fourth threshold, conclude that there are moving objects in the scene. In this case, a block is marked valid only if the absolute value of its $R_i^t$ value is smaller than a fifth threshold. This ensures that only blocks with small relative motion are used for motion estimation. The fourth threshold could be the same as the third threshold, and the fifth threshold could be the same as the second threshold.

(5) Among the blocks that are marked valid at this point, the blocks that have a MV with magnitude larger than a sixth threshold are marked invalid. This is because jitter motion has a certain maximum amplitude limit, and if the MV of the block exceeds this limit, there is either too much panning or a fast moving object. The sixth threshold depends upon the size of the lowest resolution frame, and for the 80×60 example may be in the range of 3 to 4.

(6) If the number of valid blocks in the segmentation is smaller than a seventh threshold, it is concluded that the current frame is not suitable for the estimation of jitter. In this case, the method does not compensate for motion so that it does not introduce artifacts in the video sequence. The seventh threshold depends upon the number of blocks used for the segmentation and may be in the range of 1 to 6 for the 16 blocks of the preferred embodiment.

(7) Compute the median $R_i^t$ value for all of the valid blocks in this final segmentation. If the median value is larger than an eighth threshold, conclude that there is too much panning in the video sequence. The method does not compensate for motion when there is too much panning. The eighth threshold depends upon the size of the lowest resolution frame, and for the 80×60 example may be in the range of 1 to 2.

(8) To limit computational complexity, an upper limit may be imposed on the number of blocks that will be used for motion estimation. So, if the number of valid blocks in the segmentation is larger than this upper limit, the least reliable blocks are removed from the segmentation to bring the number of blocks below the maximum limit. The reliability of each block can be measured by the distance of its $R_i^t$ value to the median of the $R_i^t$ values. This upper limit depends upon the number of blocks used for the segmentation and may be in the range of 1 to 16 for the 16 blocks of the preferred embodiment.

Step 2—Global Motion Estimation

Figure 3:
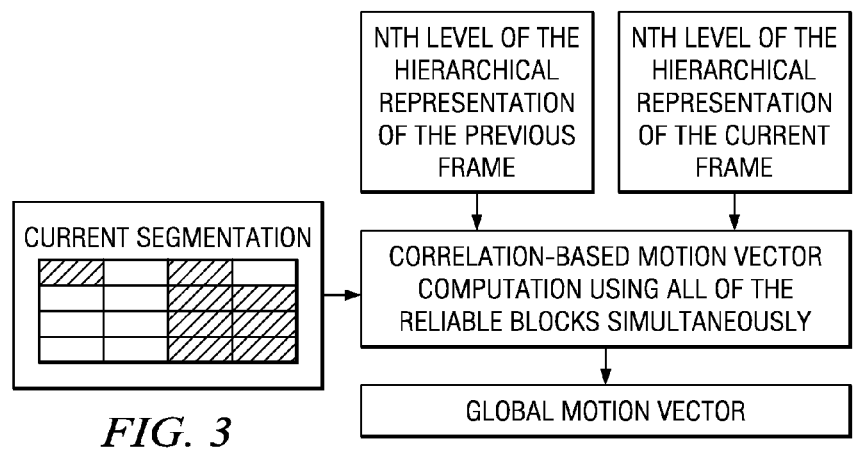
FIG. 3 show global motion estimation.

Once the segmentation has been computed at the top level (lowest resolution), a hierarchical motion estimation approach is used to find the global motion vector. The motion estimation process starts at the top level (lowest resolution) of the hierarchical representation and proceeds towards lower levels (higher resolution). At each level, the motion vector from the immediately upper level is multiplied by 2 and refined with a ±1 search as shown in FIG. 3. The search ranges at each level can be selected appropriately so that a desired effective search range is achieved at the highest resolution level. To perform the ±1 refinement, 9 SADs are computed, and the MV corresponding to the smallest SAD is picked. During the SAD computation, all blocks that are marked as valid in the segmentation are aggregated (combined together) to form one large block. In other words, to compute one SAD value, all of the pixels from all of the valid blocks are used. Combining all valid blocks together provides a very robust motion vector. At the lowest level (highest resolution) of the hierarchical representation, half-pixel and quarter-pixel motion estimation can be done depending on the desired MV accuracy.

Step 3—Motion Compensation

Figure 4:
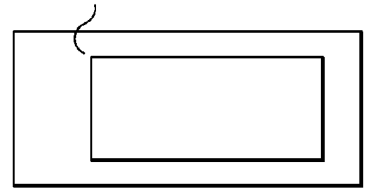
FIG. 4 illustrate compensation for motion.

For each frame, the preferred embodiment method crops a subwindow from the image and shows it to the viewer as illustrated in FIG. 4. If this subwindow is moved appropriately in the reverse direction of the (estimated) jitter motion, the viewer does not observe the jitter. Use the following equation to move the subwindow:

$$U^t = K^t U^{t-1} - W^t$$

where $U^t$ represents the coordinates of the upper left corner of the subwindow in the current frame, $W^t$ is the estimated global MV for the current frame, and $K^t$ is an adaptive accumulation coefficient. This equation is applied to the vertical and horizontal coordinates of the upper left corner of the subwindow separately. The reference point for $U^t$ is the neutral position for the window in the middle of the frame such that $U^t$ is zero in the first video frame where the window has not moved from its initial location. $K^t$ linearly changes between a minimum and a maximum value depending on how far the subwindow is from its neutral position in the middle of the frame. The value of $K^t$ is computed as follows:

$$K^t = (K_{min} - K_{max}) \|U^t\| / U_{max} + K_{max}$$

where $\|U^t\|$ is the sum of the absolute values of the components of $U^t$, $U_{max}$ is the maximum allowed deviation for the subwindow from its neutral position, $K_{max}$ is the maximum value for $K^t$, and $K_{min}$ is the minimum value for $K^t$. The first preferred embodiment uses $K_{max}=1$ and $K_{min}=0.85$.

C. Modifications

The preferred embodiments can be modified in various ways while retaining one or more of the features of low-resolution frame segmentation, single motion vector refinement for the segmented region at higher resolution, and adaptive accumulation of single motion vector for displacement estimation.

For example, the array of blocks for segmentation could be varied depending upon the number of pixels in the lowest resolution version of the frame (e.g, 3000 to 8000 pixels) and the aspect ratio (e.g., 4×5 (portrait), 4×3, 16×9, et cetera), such as a 3×3 array for 4×3 aspect ratio with 3000 pixels and 8×5 arrays for 16×9 aspect ratio with 8000 pixels. The stabilization could be performed on pictures generally in that the stabilization also applies on a field basis with either separate or combined top field and bottom field blocks. The lowest resolution full search could be replaced with a limited search. The SAD measurement could be replaced by other measurements of a motion vector prediction error such as root-meand-square. The frame hierarchy could be generated by the lowpass-lowpass of a wavelet decomposition. The block reliability could compare the quotient of the minimum SAD divided by the average SAD to a threshold such as 0.2 and thereby be independent of block size and luminance value range.

What is claimed is:

1. A method of a digital signal processor for stabilizing a video sequence, comprising:
    (a) providing a low resolution version of an input picture;
    (b) segmenting said low resolution version into reliable motion estimation blocks and unreliable motion estimation blocks;
    (c) finding a single motion vector for the aggregation of said reliable motion estimation blocks;
    (d) finding a global motion vector for said input picture from said single motion vector by scaling and refining said single motion vector, wherein said scaling and refining includes a first scaling by a factor of 2 in both horizontal and vertical directions, a first single motion vector refinement by a local search, a second scaling by a factor of 2 in both horizontal and vertical directions, and second motion vector refinement by a second local search;
    (e) compensating for jitter motion in said input picture using said global motion vector.

2. The method of claim 1 further comprising combining said reliable motion estimation blocks into a large block.

3. A method of jitter estimation for video frames, comprising:
    (a) providing a low resolution version of an input frame;
    (b) decomposing said low resolution frame into blocks;
    (c) for each of said blocks, computing motion vector prediction errors and when an average motion vector prediction error exceeds a minimum motion vector prediction error by a first threshold, designating said each of said blocks as a reliable block;
    (d) for each of said blocks, computing a relative motion vector using a corresponding relative motion vector from a prior low resolution frame;
    (e) taking integer N equal to the number of said reliable blocks with a relative motion vector which differs from the average of said relative motion vectors of all of said reliable blocks by more than a second threshold;
    (f) when said N is larger than a third threshold, for each of said reliable blocks which has a relative motion vector greater than a fourth threshold, changing the designation from reliable to unreliable;
    (g) finding a motion vector of an aggregate of said reliable blocks;
    (h) extending said motion vector of step (g) to a global motion vector of a region in said input frame corresponding to said aggregate in said low resolution frame; and
    (i) applying said global motion vector to stabilize said input frame.

4. The method of claim 3, further comprising prior to said step (g), for each of said reliable blocks which has a motion vector magnitude larger than the fourth threshold, changing the designation from reliable to unreliable.

5. The method of claim 3, further comprising, terminating the method when the average of said relative motion vectors has magnitude larger than at least one of the thresholds.

6. The method of claim 3, wherein said applying step includes an adaptive accumulation of said global motion vector to define a displacement.

7. A video camera, comprising:
    (a) means for providing a low resolution version of an input frame;
    (b) means for decomposing said low resolution frame into blocks;

(c) for each of said blocks, means for computing motion vector prediction errors and when an average motion vector prediction error exceeds a minimum motion vector prediction error by a first threshold, means for designating said each of said blocks as a reliable block;

(d) for each of said blocks, means for computing a relative motion vector using a corresponding relative motion vector from a prior low resolution frame;

(e) means for taking integer N equal to the number of said reliable blocks with a relative motion vector which differs from the average of said relative motion vectors of all of said reliable blocks by more than a second threshold;

(f) when said N is larger than a third threshold, for each of said reliable blocks which has a relative motion vector greater than a fourth threshold, means for changing the designation from reliable to unreliable;

(g) means for finding a motion vector of an aggregate of said reliable blocks;

(h) means for extending said motion vector of step (g) to a global motion vector of a region in said input frame corresponding to said aggregate in said low resolution frame; and (i) means for applying said global motion vector to stabilize said input frame.

* * * * *

UNITED STATES PATENT AND TRADEMARK OFFICE
CERTIFICATE OF CORRECTION

PATENT NO. : 7,649,549 B2
APPLICATION NO. : 11/233445
DATED : January 19, 2010
INVENTOR(S) : Aziz Umit Batur It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1107 days.

Signed and Sealed this

Twenty-eighth Day of December, 2010

David J. Kappos
*Director of the United States Patent and Trademark Office*